United States Patent [19]

McKelvey

[11] 4,138,241
[45] Feb. 6, 1979

[54] APPARATUS FOR TEMPERING GLASS SHEETS

[75] Inventor: Harold E. McKelvey, Plymouth, Mich.

[73] Assignee: Shatterproof Glass Corporation, Detroit, Mich.

[21] Appl. No.: 872,233

[22] Filed: Jan. 25, 1978

[51] Int. Cl.² ............................................. C03B 27/00
[52] U.S. Cl. ......................................... 65/351; 65/27; 65/114
[58] Field of Search ................. 65/104, 114, 348, 349, 65/350, 351, 27

[56] References Cited

U.S. PATENT DOCUMENTS

| 3,846,106 | 11/1974 | Seymour | 65/114 |
| 4,076,511 | 2/1978 | Fulton et al. | 65/114 X |

Primary Examiner—Arthur D. Kellogg
Attorney, Agent, or Firm—William E. Nobbe

[57] ABSTRACT

Apparatus for tempering glass sheets, comprising a furnace for heating the glass sheets and means for conveying the sheets horizontally therethrough, spaced conveyor rolls for receiving the heated glass sheets from the furnace, upper and lower blastheads positioned horizontally above and beneath the path of travel of the glass sheets, each blasthead comprising a spaced, parallel array of elongated tubular members extending transverse to the direction of travel of the glass sheets, each said elongated member having a cavity therein to receive a gas flow from a manifold and at least one orifice through which the gas is discharged against the respective surface of the glass sheets to rapidly cool the same, and means for independently mounting the upper and lower blastheads for pivotal movement such that they can be swung upwardly and downwardly respectively relative to the conveyor rolls to permit broken glass to fall freely between said conveyor rolls and away from the apparatus.

11 Claims, 14 Drawing Figures

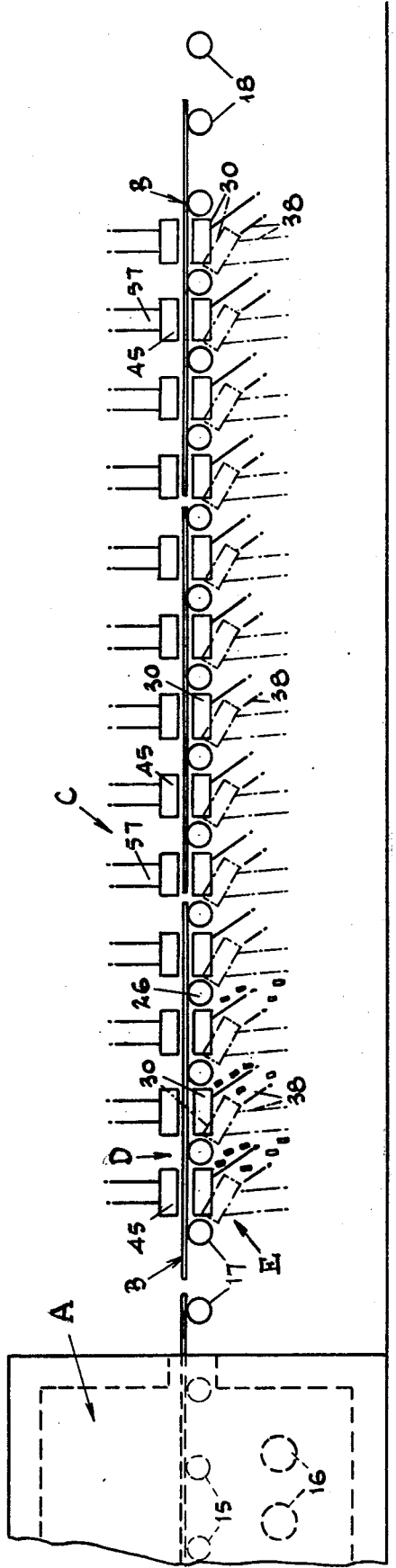
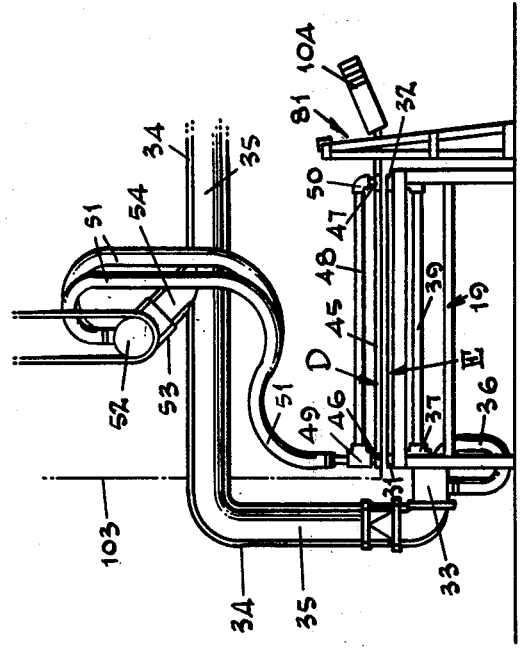

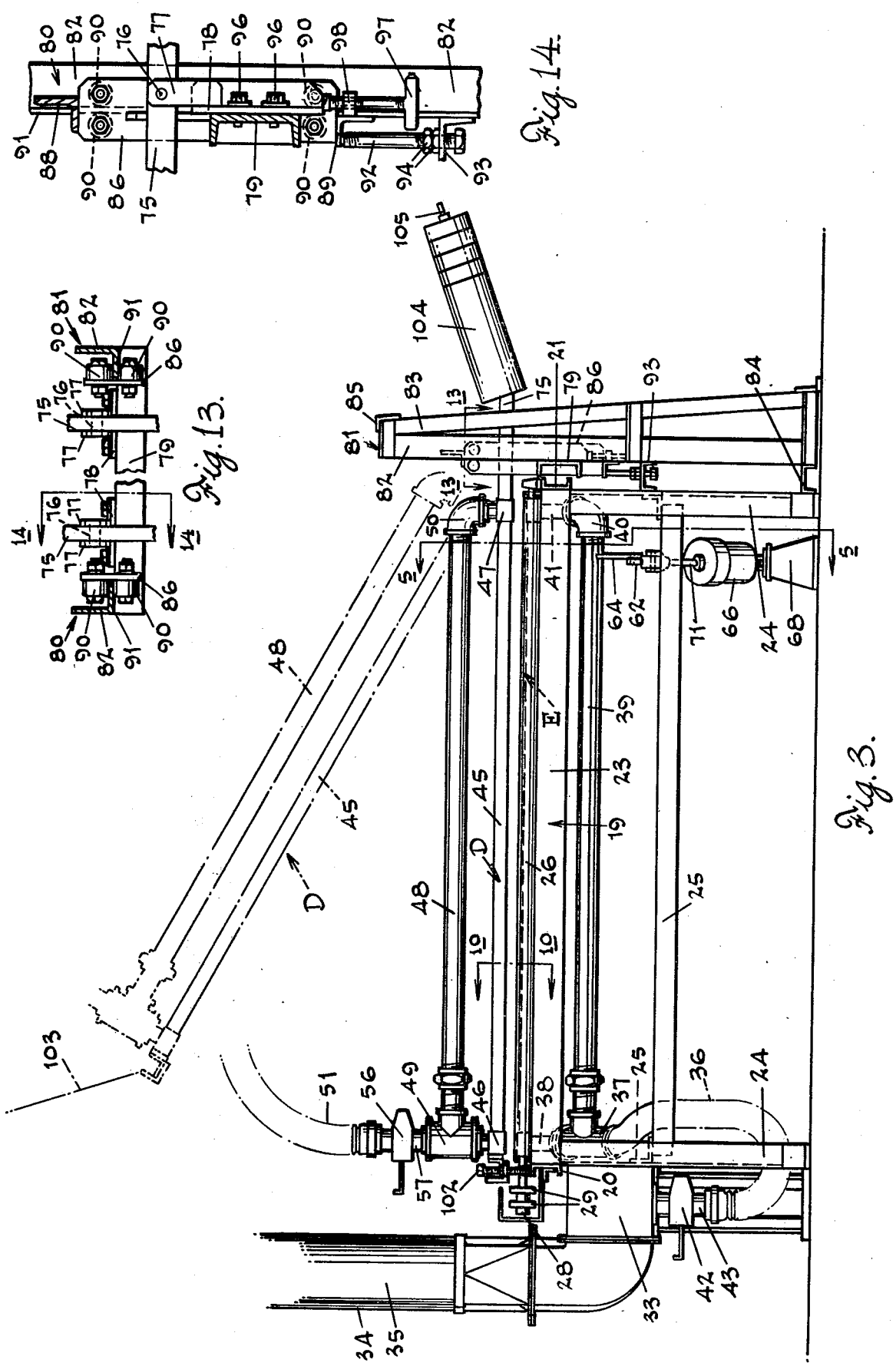

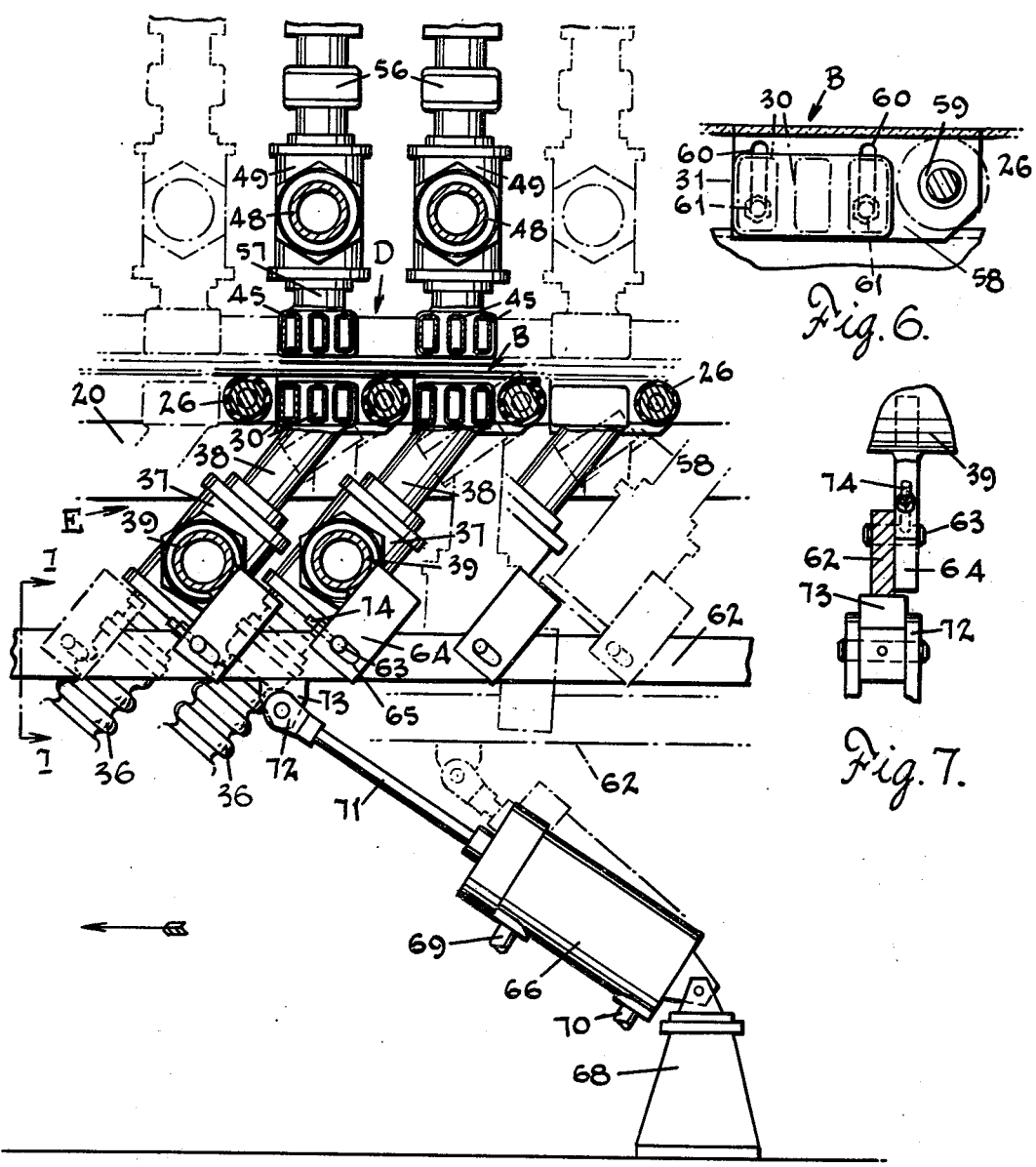
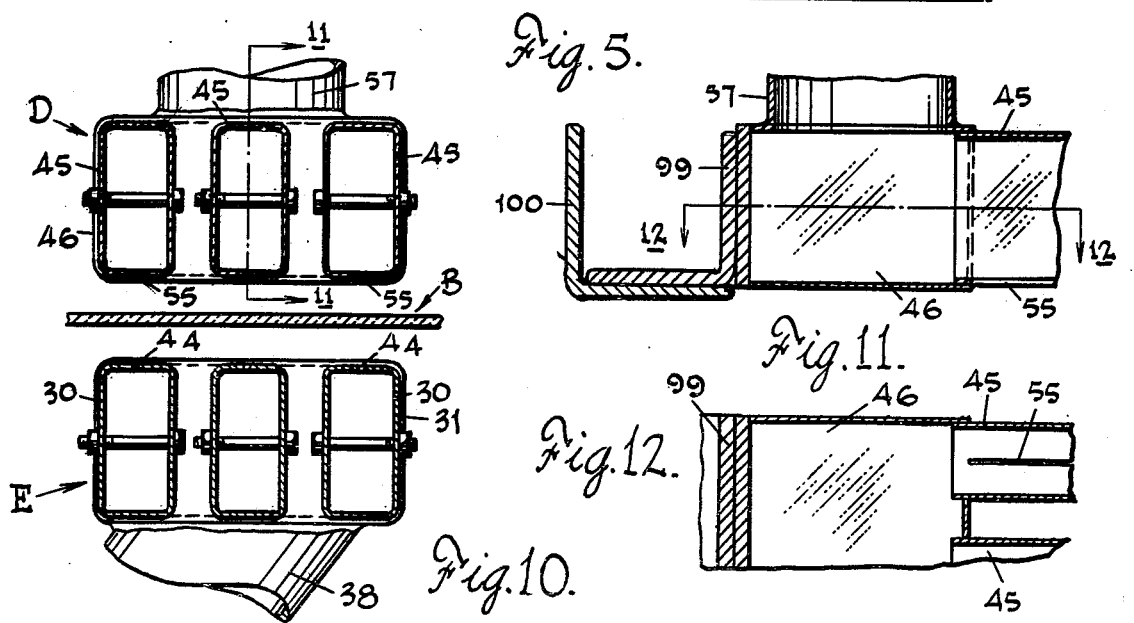

1

APPARATUS FOR TEMPERING GLASS SHEETS

BACKGROUND OF THE INVENTION

The present invention relates broadly to the tempering of glass sheets and more particularly to apparatus for tempering glass sheets by the continuous horizontal process.

According to such process, the glass sheets are conveyed horizontally through a furnace in which they are heated to substantially the softening point of the glass and, upon exiting from the furnace, are conveyed upon horizontally spaced conveyor rolls between upper and lower blastheads and rapidly cooled thereby to establish a permanent stress pattern in the sheets.

It has been found that the stress conditions created in the glass sheets during tempering frequently cause the sheets to shatter during such operations. This presents a serious problem in that the broken glass becomes lodged between the conveyor rolls causing a back-up of succeeding sheets resulting in additional breakage as well as damage to the equipment. Close monitoring of the tempering operations must therefore be maintained to see that the broken glass is removed as quickly as possible. With present methods this is a time consuming and laborious procedure.

The primary object of this invention therefore is the provision of new and novel means whereby the removal of glass sheets that are shattered during the tempering operations can be easily and quickly effected in an efficient manner and with the expenditure of a minimum amount of time and labor.

Another object of the invention is to provide tempering apparatus of the above character in which the upper and lower blastheads are mounted in such a way that they can be readily moved from their normal operating positions to positions which create clear, unobstructed passages between the conveyor rolls permitting the broken glass to fall freely between said rolls and away from the apparatus.

A further object of the invention is to provide means for independently mounting the upper and lower blastheads for pivotal movement such that they can be swung upwardly and downwardly respectively relative to the conveyor rolls to cause the broken glass to be discharged from the apparatus between the conveyor rolls.

Other details, objects and advantages of the invention will become apparent during the following description of the preferred embodiment taken in connection with the accompanying drawings.

BRIEF DESCRIPTION OF THE DRAWINGS

FIG. 1 is a diagrammatic side elevation of tempering apparatus constructed in accordance with the present invention, FIG. 2 is an end view of the exit end of the apparatus, FIG. 3 is a view similar to FIG. 2 but on an enlarged scale, FIG. 5 is a longitudinal vertical section taken substantially on line 5—5 of FIG. 3, FIG. 6 is a detail view of the means for supporting the lower blasthead, FIG. 7 is a detail vertical section taken substantially on line 7—7 of FIG. 5, FIG. 10 is a transverse vertical section taken substantially on line 10—10 of FIG. 3, FIG. 11 is a detail section taken substantially on line 11—11 of FIG. 10, FIG. 12 is a detail section taken substantially on line 12—12 of FIG. 11, FIG. 13 is a detail section taken substantially on line 13—13 of FIG. 3, and FIG. 14 is a transverse vertical section taken substantially on line 14—14 of FIG. 13.

DESCRIPTION OF THE PREFERRED EMBODIMENT

Figure 4:
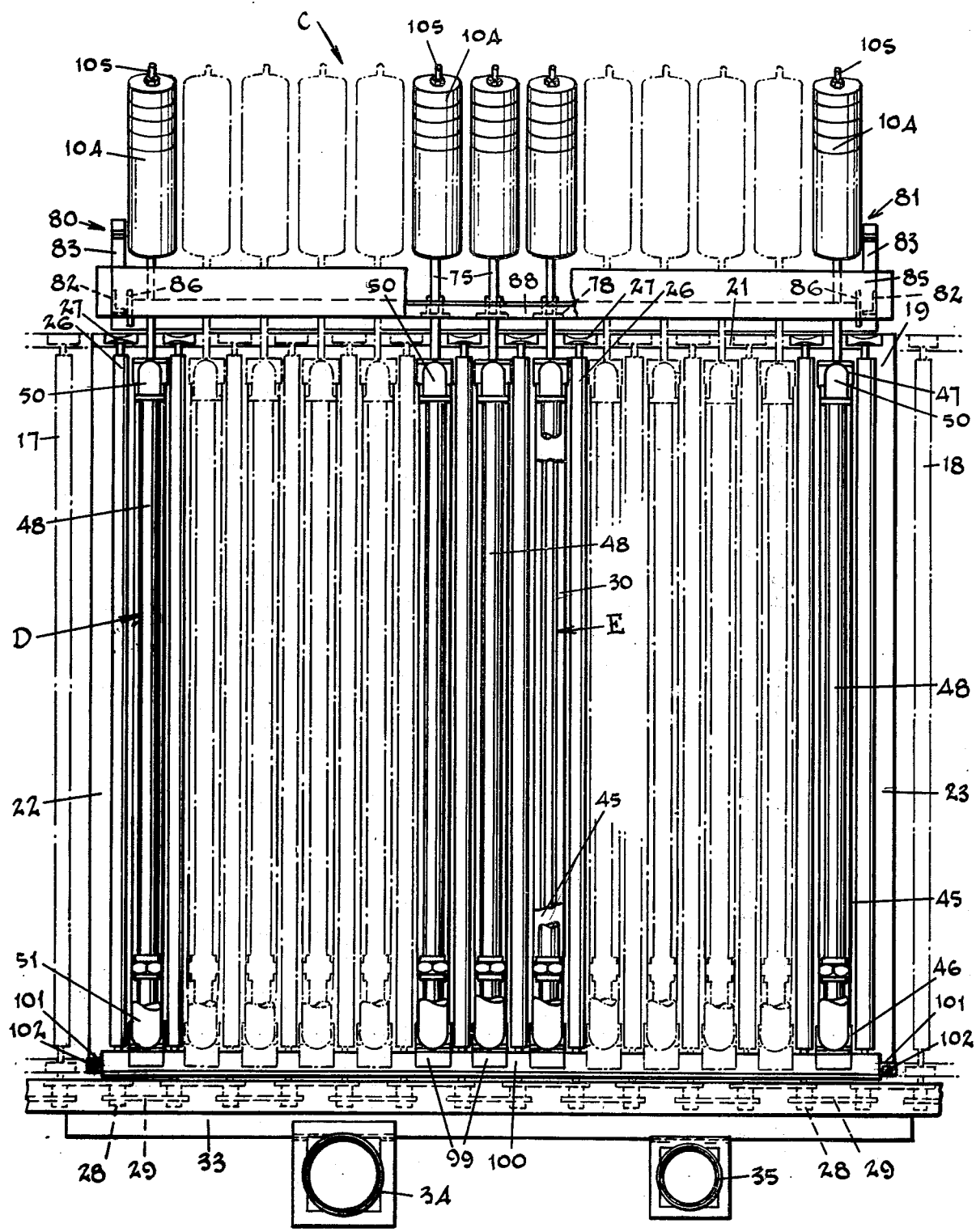
FIG. 4 is a plan view of the apparatus.

Referring now to the drawings and particularly to FIG. 1, the tempering apparatus of this invention includes generally an elongated furnace A in which the glass sheets B are heated and a quenching section C including the upper and lower blastheads D and E respectively for rapidly chilling the heated glass sheets as they issue from the furnace to establish a permanent stress pattern therein.

The glass sheets are transported horizontally through the furnace by any suitable conveyor means such as the rolls 15. The furnace can also be heated in any conventional manner such as by the gas fired radiant heating tubes 16.

Upon issuing from the furnace the heated glass sheets move into the quenching section C where they are received and carried forwardly by a series of spaced conveyor rolls 17 located between the upper and lower blastheads D and E. The tempered glass sheets are discharged from the quenching section onto a series of carry-out conveyor rolls 18, Referring particularly to the lower blasthead E, said blasthead comprises a rectangular supporting frame 19 composed of the longitudinal side rails 20 and 21 and the transverse end members 22 and 23 supported by pedestals 24 which are braced by members 25.

The conveyor rolls 17 comprise a plurality of rubber covered shafts 26 journaled at their opposite ends in bearings 27 carried by the frame side rails 20 and 21. Each conveyor roll shaft is equipped at one end with a pair of sprocket gears 28 that are driven by a plurality of sprocket chains 29 (FIGS. 4 and 8) from a suitable source of power.

The lower blasthead E also embodies a plurality of elongated, parallel tubular members 30 which extend transverse to the direction of travel of the glass sheets. As shown in FIGS. 5 and 10, the tubular members 30 are substantially rectangular in cross section and are arranged in groups of three positioned between adjacent conveyor rolls 17, although one or any desired number may be used depending upon the distance between the conveyor rolls.

Figure 8:
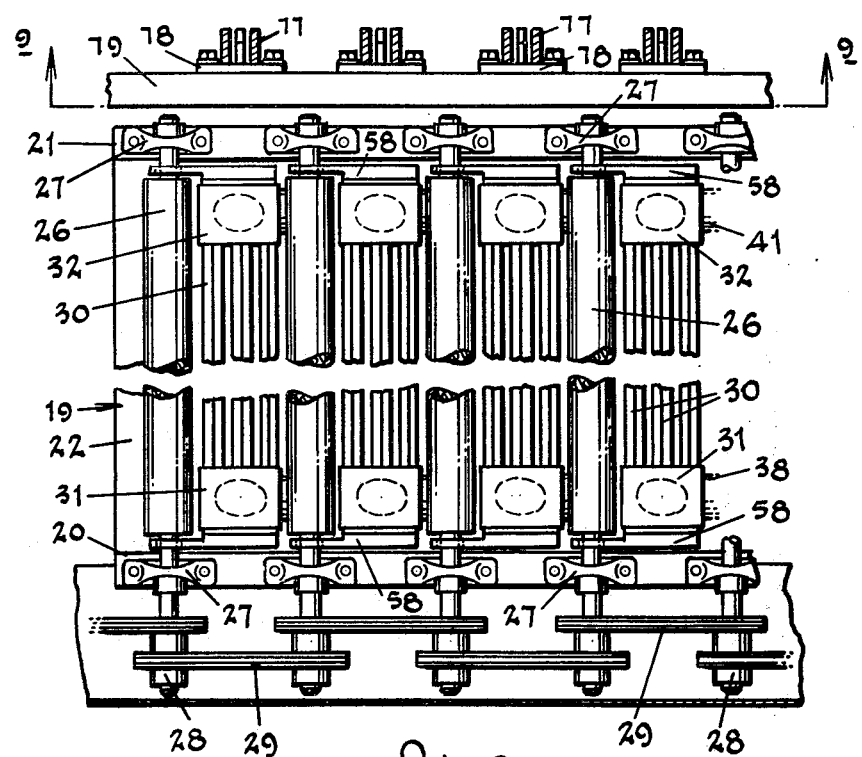
FIG. 8 is a plan view showing the arrangement of the lower blasthead and roll conveyor.

The tubular members 30 are connected at their opposite ends, in groups of three, to hollow end members or boxes 31 and 32 (FIG. 8). The boxes 31 are, in turn, connected to a longitudinally extending common manifold 33 secured to the supporting frame 15 (FIGS. 2 and 3). Air or other gas for rapidly cooling the glass sheets is supplied to the manifold 33 from a suitable source through the ducts 34 and 35, with the air passing from the manifold to the several groups of tubular members 30 through individual flexible hose connections 36 to T-unions 37 and from said unions through the angularly disposed pipes 38 to the boxes 31.

Also connected to the T-unions 37 are horizontal transverse pipes 39 connected at their opposite ends to the boxes 32 through elbows 40 and angularly disposed pipes 41. In this way, cool air is supplied to both ends of the tubular members whereby to effect a more uniform cooling of the glass sheets. The flow of air from the manifold 33 to each of the hoses 36 can be controlled by valves 42 located on the pipes 43.

The tubular members 30 each has a cavity acting as a plenum for conducting the air flow received from the manifold 33 to a longitudinal slot 44, or series of orifices, in the top wall of the tubular member for directing the air against the lower surface of the glass sheets.

The upper blasthead D is similar to the lower blasthead C in that it also includes transverse, parallel tubular members 45 arranged in groups of three which are positioned directly above like groups of lower tubular members 30. The tubular members 45 of each group are connected at their opposite ends to boxes 46 and 47. Extending parallel above each group of tubular members 45 is a transverse pipe 48 for supplying air or other gas to both ends of the tubular members, said pipe being connected at one end to a T-union 49 secured to the box 46 and at its opposite end to box 47 through an elbow 50.

As illustrated in FIG. 2, a flexible supply hose 51 leads from each of the boxes 46 to a manifold 52 that communicates with the ducts 34 and 35 by way of branches 53 and 54 so that air is supplied to the upper and lower tubular members from a common source. Each of the tubular members 45 is also provided with a cavity constituting a plenum for receiving the air flow from the manifold 52 and for discharging it through an elongated slot 55, or series of orifices, in the bottom wall thereof against the upper surface of the glass sheets. A valve 56 can be located on each of the pipes 57 to regulate the flow of air from the manifold 52 to the tubular members.

As set forth above, it is not unusual for glass sheets to be shattered during the tempering operations as a result of the stress conditions created therein. And that the present invention contemplates the provision of means whereby the broken glass can be easily and quickly removed from the apparatus before further damage occurs.

To this end, the invention embodies means for mounting the upper and lower tubular members 30 and 45 in such a way that they can be moved bodily away from the line of travel of the glass sheets to cause the broken glass to fall freely between the conveyor rolls and away from the apparatus. More specifically, the upper and lower tubular members are pivotally mounted at one end so that they can be swung upwardly and downwardly respectively relative to the conveyor rolls.

Referring first to the mounting of the lower blasthead E, the tubular members 30 thereof are pivotally supported on the conveyor roll shafts 26 so that they can be swung from their full line operative position shown in FIGS. 1 and 5 to a downwardly inclined position indicated by the broken lines in said figures. Thus with reference to FIG. 6, each of the boxes 31 and 32 for each group of tubular members is provided with an arm 58 having a ring bearing 59 on the conveyor roll shaft 26 which permits the boxes to pivot about said shaft. The tubular members 30 of each group can also be individually raised and lowered with reference to the bottom surface of the glass sheets and for this purpose the arms 58 are provided with vertical slots 60 through which pass fastening bolts 61 secured to the boxes 31 and 32.

As noted above, the air supply pipes 38 and 41 at opposite ends of each group of tubular members 30 are angularly disposed in order to facilitate the pivotal movement of the boxes 31 and 32 on the conveyor roll shafts 26. To effect this pivotal movement, there is provided, as in FIGS. 3 and 5, a longitudinally extending horizontal bar 62 provided with a plurality of pins 63, one for each group of tubular members 30. Secured to each of the horizontal transverse air supply pipes 39, by welding or the like, is a vertical plate 64 having a transverse slot 65 for receiving one of the pins 63.

Mounted beneath the horizontal bar 62 is a hydraulic cylinder 66 pivoted at 67 to a floor standing support 68. The cylinder 66 is provided with inlet and outlet ports 69 and 70 respectively and with a piston rod 71 which is attached at its outer end by a clevis 72 to a lug 73 on said bar 62. The inlet and outlet ports 69 and 70 are connected to a fluid source under pressure and, by means of a suitable valve, fluid can be supplied alternately to said ports to project or retract the piston rod 71. When the piston rod 71 is moved to its projected position as shown in full lines in FIG. 5, the arms 58, with the boxes 31 and 32, will pivot about the conveyor roll shafts 26 and the tubular members 30 swung upwardly into operative position between the conveyor rolls. When the piston rod 71 is retracted, the bar 62 will be lowered and the tubular members swung downwardly to the inclined broken line position relative to the conveyor rolls to provide clear spaces between the conveyor rolls 26 through which the broken glass can freely fall, as diagrammatically illustrated in FIG. 1.

Individual adjustment of the separate groups of tubular members 30 to maintain them in horizontal alignment with one another is achieved by a screw 74 (FIG. 7) which is threaded through the plate 64 and engages the pin 63, said pin being slidable in the slot to effect raising or lowering of the plate 64 relative to the bar 62. This adjustment can be carried out in conjunction with the aforementioned vertical adjustment of the individual tubular members 30 (FIG. 6) whereby said tubular members can be maintained in horizontal alignment with one another and at the desired distance from the glass sheets when in operative position.

When the lower tubular members 30 are swung downwardly as above described to permit broken glass to fall between the conveyor rolls some of the larger pieces of glass may become tilted and strike the upper tubular members 45 with the result that they become lodged between the conveyor rolls and prevented from being discharged from the apparatus. To correct this when it occurs the present invention provides means for pivotally mounting the upper tubular members 45 such that they can be swung upwardly away from the conveyor rolls 26, as indicated in broken lines in FIG. 3. This will release the broken glass and permit it to fall between the conveyor rolls.

To this end and with particular reference to FIGS. 3, 4, 13 and 14, there is carried by the box 47 for each group of tubular members 45 a horizontal bar 75 pivotally supported intermediate its ends on a pin 76 carried by a yoke 77 which is secured to a vertical plate 78. Each of these plates is mounted for vertical adjustment on a horizontal channel member 79 which extends the entire length of the quenching section C. Positioned at opposite ends of the bar 75 are vertical support frames 80 and 81, each composed of the two upwardly converging legs 82 and 83 fastened together at their upper and lower ends and with the legs 82 being secured to the adjacent support pedestals 24 by horizontal channel members 84. The two support frames 80 and 81 are connected together at their upper ends by an angle beam 85 (FIG. 3).

Carried by each of the support frames 80 and 81 inwardly of but adjacent thereto is a vertically adjustable carriage 86, comprising an end plate 87, with the end plates of the two carriages being connected at their upper ends by a horizontal angle beam 88, at their lower ends by a horizontal angle member 89 and intermediate their ends by a horizontal channel member 79.

The carriages 86 are each provided with pairs of rollers 90 carried by the respective end plate 87 and riding on the inwardly directed flange 91 of support leg 82. The carriages 86 can be adjusted vertically to raise and lower the bars 75 and the respective end of the tubular members 45 by bolts 92 which pass upwardly through bracket members 93 and engage the angle member 89. Lock nuts 94 are provided to maintain the bolts 92 in adjusted position.

Figure 9:
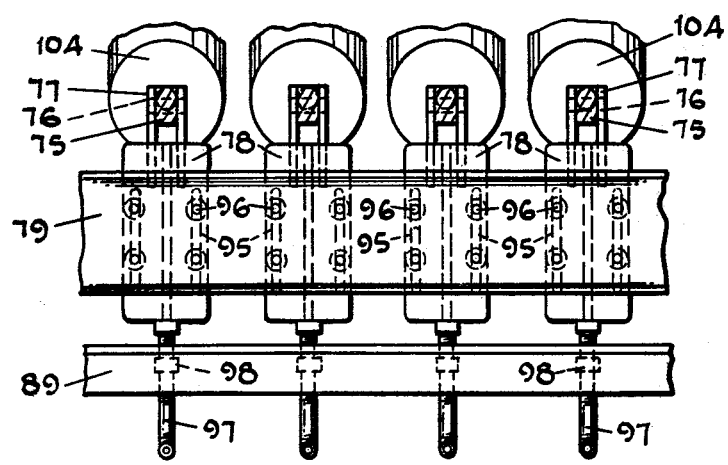
FIG. 9 is a longitudinal vertical section taken substantially on line 9—9 of FIG. 8 showing the upper blasthead supporting structure.

Each of the vertical plates 78 has pairs of vertical slots 95 (FIG. 9) through which bolts 96 are passed and threaded into the horizontal channel member 79. This provides for individual vertical adjustment of the bars 75 upon adjustment of the plates 78 and consequently the tubular members 45. The tubular members can be brought into a common horizontal plane by hand bolts 97 threaded through blocks 98 on the angle member 89.

The boxes 46 at the opposite end of the tubular members 45 are provided with angle brackets 99 (FIGS. 11 and 12) fixed to their outer surfaces, said brackets being supported on a horizontal support member 100. This support member is provided at its opposite ends with blocks 101 through which pass setting bolts 102 engaging the horizontal side member 20 of the supporting frame and by which the adjacent ends of the tubular members can be raised or lowered to level the tubular members 45.

When it is desired to raise the tubular members 45 from their full line operative position shown in FIG. 3 to the upwardly inclined broken line position an overhead hoist will produce such movement by means of a cable 103 connected to the bar 100. When moved to this position any broken glass that might have become lodged between the conveyor rolls and the upper tubular members will be released and permitted to fall between the conveyor rolls. The raising of the upper tubular members by the cable 103 can be facilitated by the provision of counter-weights 104 carried by rods 105 secured to the bars 75.

As described above in connection with the vertical adjustment of the individual tubular members 30 relative to the bottom surface of the glass sheets (FIG. 6) the upper tubular members 45 can be individually raised and lowered to obtain the same spaced distance upon release of the bolts 96 and adjustment of the hand bolts 97 (FIG. 14).

While there has been illustrated and described a preferred embodiment of the invention, it will be understood that modifications may be made without departing from the spirit and scope of the claims.

I claim:

1. In apparatus for tempering flat sheets of glass in combination, a furnace for heating the glass sheets and a plurality of horizontally aligned conveyor rolls for supporting and conveying the glass sheets through the furnace, means for rapidly cooling the heated glass sheets upon issuing from said furnace, said cooling means comprising a plurality of spaced horizontally aligned conveyor rolls extending parallel with said furnace rolls for receiving the glass sheets therefrom, upper and lower horizontal blastheads positioned above and beneath the last-named conveyor rolls respectively, the lower blasthead comprising a plurality of elongated tubular members positioned in the spaces between said conveyor rolls and extending parallel therewith, each tubular member being provided with a cavity for receiving an air flow and having at least one orifice for directing the air against the bottom surface of the glass sheets, and means for mounting said tubular members such that they can be lowered relative to the conveyor rolls from an operative position to an inoperative position to permit broken glass to fall through the spaces between the conveyor rolls vacated by said tubular members.

2. Apparatus as claimed in claim 1, in which the upper blasthead also comprises a plurality of tubular members positioned above and extending parallel with the lower tubular members, each upper tubular member being provided with a cavity for receiving an air flow and having at least one orifice for directing the air against the upper surface of the glass sheets, and means for pivotally mounting the upper tubular members at one end such that they can be swung upwardly as a unit relative to said conveyor rolls and independently of the swinging movement of the lower tubular members.

3. Apparatus as claimed in claim 1, including means for independently adjusting the opposite ends of the tubular members vertically to bring them into a common horizontal plane.

4. Apparatus as claimed in claim 2, including means for independently adjusting the opposite ends of the upper tubular members vertically to bring them into a common horizontal plane.

5. Apparatus as claimed in claim 1, in which the tubular members are arranged in groups of more than one, with each group being positioned in the space between adjacent conveyor rolls, means for mounting each group of tubular members for pivotal movement at its opposite ends, and means operatively connected with said mounting means for swinging the several groups of tubular members as a unit from a horizontal operative position between the conveyor rolls to a downwardly inclined inoperative position beneath said conveyor rolls to permit broken glass to fall through the spaces between said conveyor rolls vacated by said groups of tubular members.

6. Apparatus as claimed in claim 2, in which the upper tubular members are also arranged in groups of more than one, with each group being positioned above and parallel with one of the groups of lower tubular members, means for pivotally mounting each group of upper tubular members at one end, and means for swinging the several groups of upper tubular members as a unit from a horizontal operative position to an upwardly inclined inoperative position.

7. Apparatus as claimed in claim 5, including means for independently adjusting the opposite ends of the groups of tubular members vertically to bring said groups into a common horizontal plane.

8. Apparatus as claimed in claim 6, including means for independently adjusting the opposite ends of the upper groups of tubular members vertically to bring said groups into a common horizontal plane.

9. Apparatus as claimed in claim 1, in which the tubular members of the lower blasthead are arranged in groups of more than one, with each group being positioned in the space between adjacent conveyor rolls, hollow end members connected to the opposite ends of each group of tubular members and through which the air flow passes into said tubular members, an arm fixed to each hollow end member and pivotally mounted on an adjacent conveyor roll, and means operatively connected with said arms for swinging the several groups of tubular members as a unit about said conveyor rolls from a horizontal operative position between the conveyor rolls to a downwardly inclined inoperative position beneath said conveyor rolls to permit broken glass to fall through the spaces between the said conveyor rolls vacated by said groups of tubular members.

10. The apparatus claimed in claim 9, including means associated with said arms for individually adjusting the tubular members of each group vertically, and means for independently adjusting the several groups of tubular members to maintain them in horizontal alignment with one another.

11. The apparatus claimed in claim 9, in which the tubular members of the upper blasthead are arranged in groups of more than one, hollow end members connected to the opposite ends of each of said groups of tubular members and through which the air flow passes into said tubular members, each group of tubular members being positioned above and parallel with one of the groups of tubular members of the lower blasthead, means operatively connected with the hollow end members at one end of each group of tubular members for pivotally supporting the same, means associated with said supporting means for independently raising and lowering the pivoted end of each group of tubular members to bring them into horizontal alignment with one another, means for individually raising and lowering the same end of the tubular members of each group, and means connected with the hollow end members at the other end of the groups of tubular members for supporting the same and for adjusting them vertically relative to one another to bring them into horizontal alignment.

* * * * *